(12) United States Patent
Boisvert et al.

(10) Patent No.: US 9,007,413 B2
(45) Date of Patent: Apr. 14, 2015

(54) LASER MARKING SYSTEM AND METHOD

(75) Inventors: Clifford J. Boisvert, La Grande Park, IL (US); Carlos Andrés Mejia-Quinchia, Schaumburg, IL (US); Richard Mark Orlando Golding, Mount Prospect, IL (US)

(73) Assignee: Crown Packaging Technology, Inc., Alsip, IL (US)

( * ) Notice: Subject to any disclaimer, the term of this patent is extended or adjusted under 35 U.S.C. 154(b) by 324 days.

(21) Appl. No.: 13/584,521

(22) Filed: Aug. 13, 2012

(65) Prior Publication Data

US 2014/0042132 A1   Feb. 13, 2014

(51) Int. Cl.
*B23K 26/08* (2014.01)
*B41M 5/24* (2006.01)
*B44B 7/00* (2006.01)
*B23K 26/36* (2014.01)
*B21D 43/02* (2006.01)
*B23K 26/00* (2014.01)
*B23K 31/10* (2006.01)
*B41M 5/26* (2006.01)

(52) U.S. Cl.
CPC ............ *B23K 26/365* (2013.01); *B44B 7/002* (2013.01); *B21D 43/022* (2013.01); *B23K 26/0846* (2013.01); *B23K 26/0066* (2013.01); *B23K 26/08* (2013.01); *B23K 31/10* (2013.01); *B23K 26/083* (2013.01); *B41M 5/24* (2013.01); *B41M 5/26* (2013.01)

(58) Field of Classification Search
CPC .. B23K 26/0066; B23K 26/08; B23K 26/365; B23K 26/083; B23K 31/10; B41M 5/24; B41M 5/26; B44B 7/002

USPC ............... 219/121.6, 121.85, 121.68, 121.69, 219/121.82; 347/224, 110; 413/8, 25, 56, 413/12; 220/266
See application file for complete search history.

(56) References Cited

U.S. PATENT DOCUMENTS

| | | | |
|---|---|---|---|
| 3,898,417 A | 8/1975 | Atkinson | |
| 4,375,025 A | 2/1983 | Carlson | |
| 4,476,781 A | 10/1984 | Kubacki et al. | |
| 5,511,920 A | 4/1996 | Artrip | |
| 6,080,958 A * | 6/2000 | Miller et al. | 219/121.68 |
| 6,105,806 A | 8/2000 | Stasiuk | |
| 6,433,302 B1 | 8/2002 | Miller et al. | |
| 6,455,806 B1 * | 9/2002 | Jendick | 219/121.68 |
| 6,476,349 B1 | 11/2002 | Jendick | |
| 6,479,787 B1 | 11/2002 | Jendick | |

(Continued)

FOREIGN PATENT DOCUMENTS

| | | |
|---|---|---|
| CA | 2301655 | 3/1999 |
| CA | 2307074 | 9/2001 |

(Continued)

*Primary Examiner* — Samuel M Heinrich
(74) *Attorney, Agent, or Firm* — Baker & Hostetler LLP

(57) ABSTRACT

A system for creating marked can tabs may include an isolation mechanism located in the path of the tab material strip between a tab material dereeler and a tab forming press and a system suitable for marking the tab material strip. The isolation mechanism may be configured to convert discontinuous motion of the tab material strip proximate the tab forming press into continuous motion of the tab material strip at the dereeler. The system may be suitable for marking the tab material strip. The marking system may be located between the dereeler and the isolation mechanism such that the laser system acts on the tab material strip while it is moving at a relatively constant speed.

20 Claims, 11 Drawing Sheets

(56) References Cited

U.S. PATENT DOCUMENTS

| | | |
|---|---|---|
| 6,498,318 B1 | 12/2002 | Miller et al. |
| 6,501,046 B1 | 12/2002 | Miller et al. |
| 6,590,183 B1 | 7/2003 | Yeo |
| 6,706,995 B2 | 3/2004 | Miller et al. |
| 6,777,098 B2 | 8/2004 | Yeo |
| 6,854,947 B2 | 2/2005 | Lee |
| 6,926,487 B1 | 8/2005 | Jendick |
| 7,150,597 B2 | 12/2006 | Lee |
| 2011/0084051 A1 | 4/2011 | Reed et al. |

FOREIGN PATENT DOCUMENTS

| | | |
|---|---|---|
| EP | 1113901 | 7/2001 |
| WO | WO 97/11892 | 4/1997 |
| WO | WO 98/16430 A1 | 4/1998 |
| WO | WO 99/09853 | 3/1999 |
| WO | WO 00/03832 | 1/2000 |
| WO | WO 01/51295 A1 | 7/2001 |
| WO | WO 2008/070979 A1 | 6/2008 |

\* cited by examiner

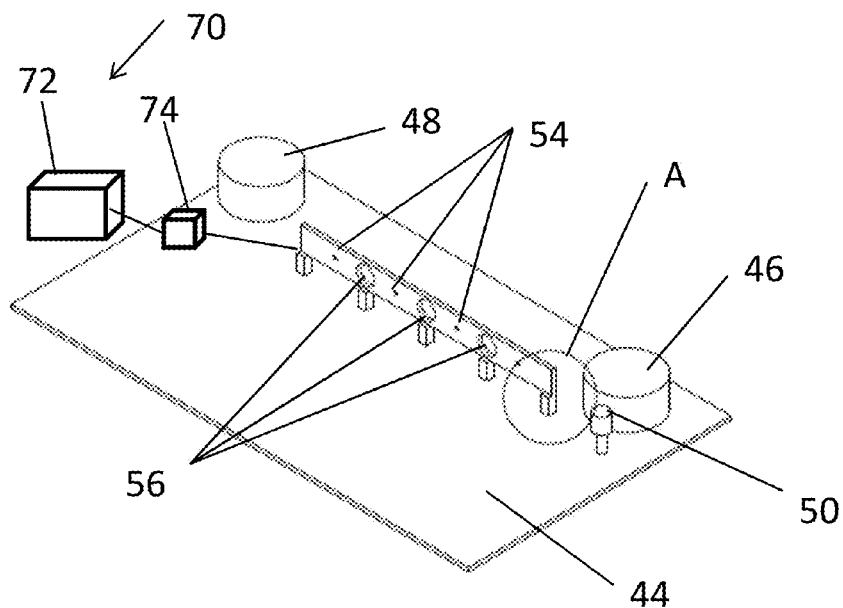
Fig. 4
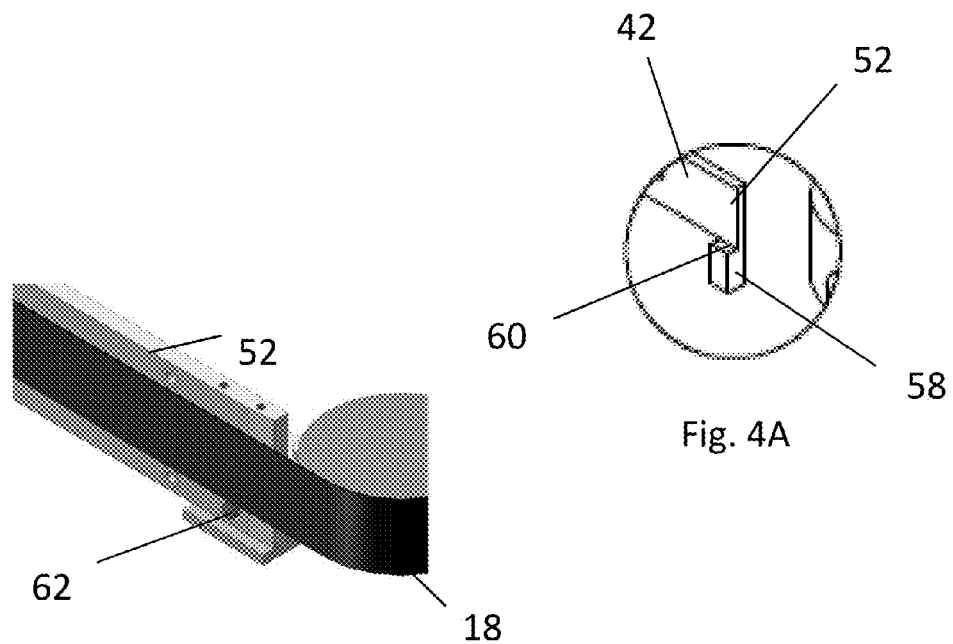
Fig. 4A
Fig. 4B

LASER MARKING SYSTEM AND METHOD

TECHNICAL FIELD

The following summary and descriptions relate producing markings on packages and more particularly to apparatuses and methods for creating laser etched tabs for can ends.

BACKGROUND

The tab portion of cans may be configured to contain advertising indicia or other marks. This indicia may be created in various ways, including painting, printing, laser etching, and laser marking. These methods of creating indicia are known and include etching a material strip before the strip is cut and pressed into a tab and printing a negative image of indicia on a material strip. Known methods may rely on the intermittent motion of the material strip prior to entering a press machine.

One of the challenges in marking the material strip prior to it entering the press machine is handling the material in a way that avoids scratching the material as the strip passes to the press. Methods of handling other materials, such as can making stock and silicon wafers are known. For example, one known method of handling long material stock strips uses long rails on plates that sit on either side of the material stock such that the strip contacts the rails in areas of the strip where scratching is not apparent on the final product. Another known method for handling silicon wafers includes the use of a Bernoulli grip so that wafers float on an air stream while passing against a vertical plate.

SUMMARY

A laser marking system located in a can tab feeding system may include an isolation mechanism located in a path of a tab material strip between a tab material dereeler and a tab forming press, the isolation mechanism converting discontinuous motion of the tab material strip proximate the tab forming press into continuous motion of the tab material strip at the dereeler. The system may further include a laser system suitable for marking the tab material strip, the laser marking system being located between the dereeler and the isolation mechanism such that the laser system acts on the tab material strip while it is moving at a relatively constant speed.

A laser marking and material strip handling system located in a tab feeding system may include a laser system suitable for marking a tab material strip and a plate oriented parallel to an orientation of the tab material strip, the plate being spaced apart from the tab strip material and including at least one hole configured to enable air flow therethrough, whereby the air flow is configured to provide a supporting layer of air on one side of the tab stock which in combination with atmospheric air on the opposite side creates a non-contacting guide for the tab material strip near the laser marking system.

A laser marking registration system may include a laser system suitable for marking a tab material strip with indicia and with a registration mark. The laser marking registration system may further include a vision subsystem located proximate to a press for sensing the location of the registration mark. The sensed location of the registration mark can be compared with a predetermined, desired location of the registration mark in order to confirm the accuracy of the press tooling relative to the indicia and providing feedback to the laser marking system to compensate for image drift.

A laser marking and material strip handling system located in a tab feeding system may include a laser system suitable for marking a tab material strip and a pair of plates. At least one of the plates may include at least one longitudinally extending rail configured to hold the material strip. At least one of the plates may also include at least one opening configured to provide access for the laser system to mark the material strip as it passes through the pair of plates.

A marking system located in a material feeding system for a tab forming press, the marking system comprising an isolation mechanism located in a path of a tab material strip between a tab material dereeler and the tab forming press, the isolation mechanism converting discontinuous motion of the tab material strip proximate the tab forming press into continuous motion of the tab material strip at the dereeler. The marking system also includes a digital printing system suitable for marking the tab material strip, the digital printing system being located between the dereeler and the isolation mechanism such that the digital printing system acts on the tab material strip while it is moving at a relatively constant speed.

BRIEF DESCRIPTION OF THE DRAWINGS

The foregoing summary, as well as the following detailed description of the various embodiments of the application, will be better understood when read in conjunction with the appended drawings. For the purposes of illustrating the various embodiments of the disclosure, reference is made to the drawings. It should be understood, however, that the application is not limited to the precise arrangements and instrumentalities illustrated in the drawings, in which:

FIG. 4 is a partial perspective view of a laser marking system, including a material strip;

FIG. 4A is a magnified partial perspective view of section A of the laser marking system shown in FIG. 4;

FIG. 4B is a partial schematic perspective view of a laser marking system, including a material strip;

DETAILED DESCRIPTION OF ILLUSTRATIVE EMBODIMENTS

Figure 1:
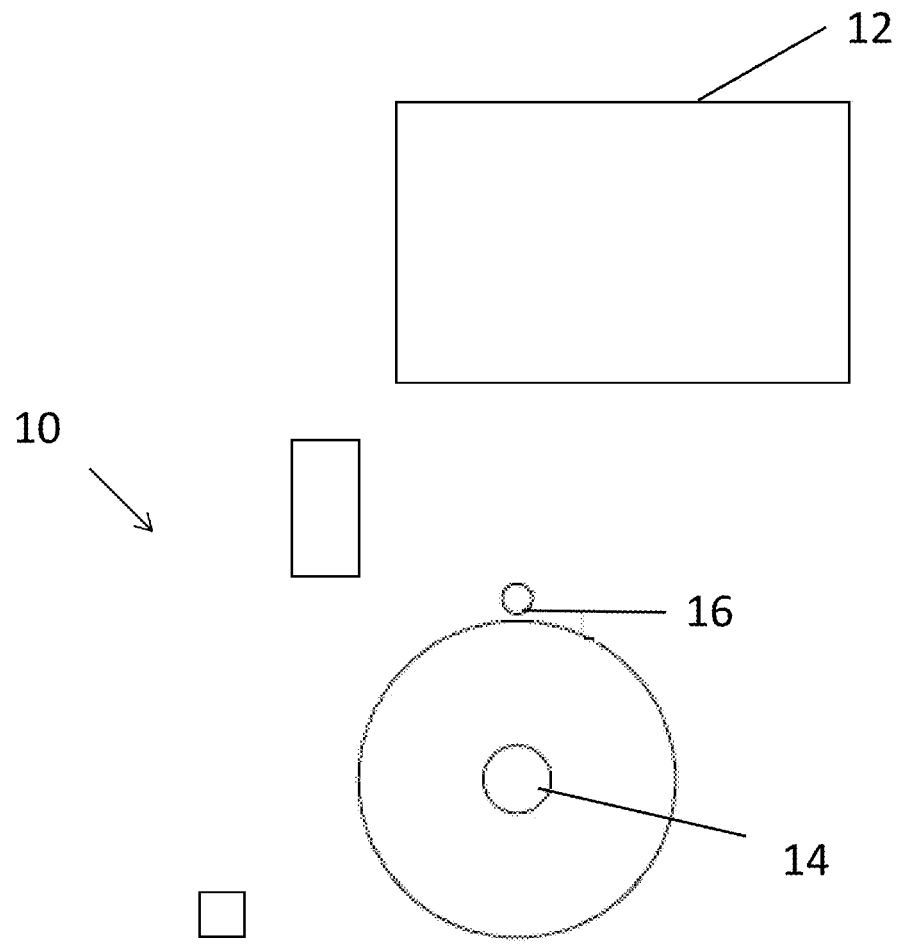
FIG. 1 is a schematic top view of a can tab feeding system of the prior art.

As shown in FIG. 1, a feeding system 10' for a can tab press 12 includes a tab material dereeler 14 that feeds a material strip 18 into the press 12 and an isolation mechanism 16, described in detail below. The press 12, which, for example, may be a tab feeding press or a conversion press, forms tabs by cutting and bending portions of material strip (not shown in FIG. 1). In some embodiments, the press 12 may be a Bruderer BSTA-90/20 made in Switzerland or a Minster PM2-80 made in the United States. The material strip may be placed in the can tab feeding system 10' in a coil. This coil may comprise aluminum alloy 5182 having a thickness of 0.0110 inches or less and may be plain or coated. The tab material dereeler 14 is used to uncoil the material strip before it enters the press 12.

Figure 2:
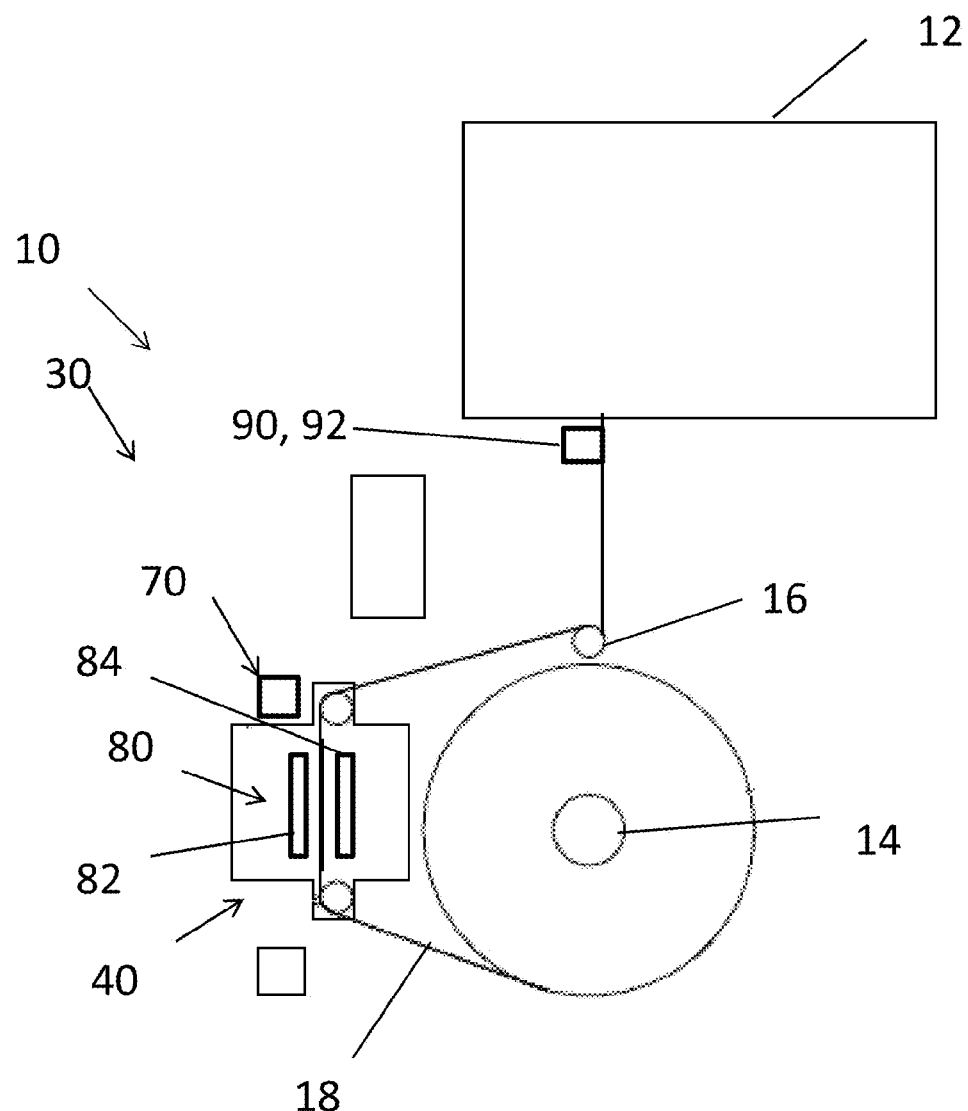
FIG. 2 is a schematic top view of a can tab feeding system, including a laser marking system.
Figure 10:
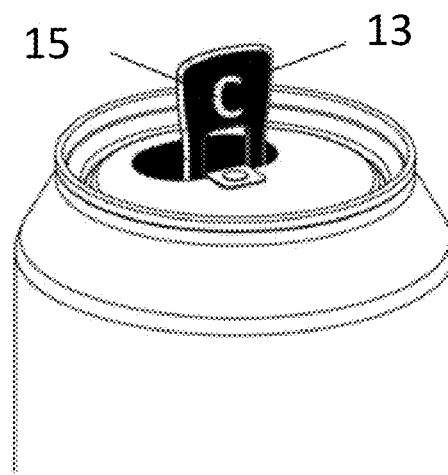
FIG. 10 is a back partial perspective view of a can with a tab that has laser etched indicia.
Figure 11A:
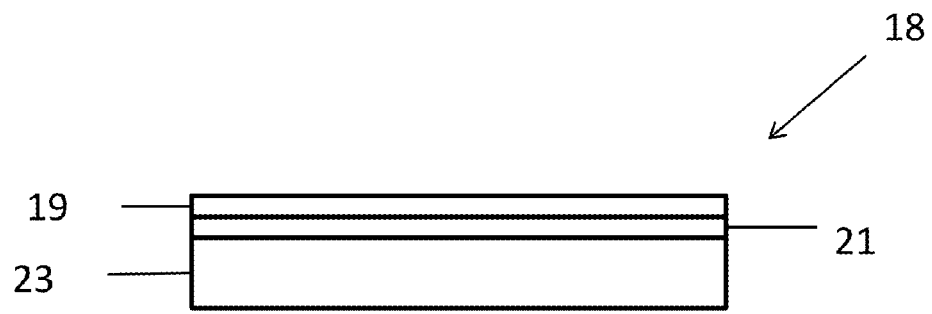
FIG. 11A is a partial schematic cross sectional view of a material strip before a laser marking process.
Figure 11B:
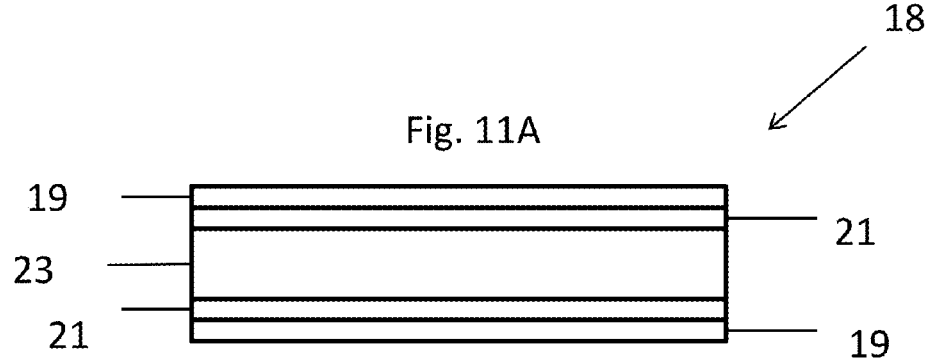
FIG. 11B is a partial schematic cross sectional view of a material strip before a laser marking process.
Figure 12A:
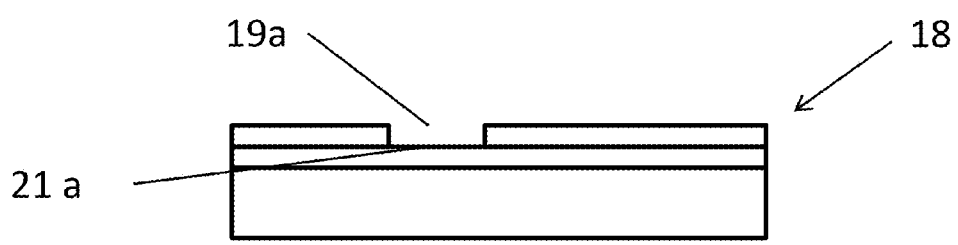
FIG. 12A is a partial schematic cross sectional view of a material strip after a laser marking process.
Figure 12B:
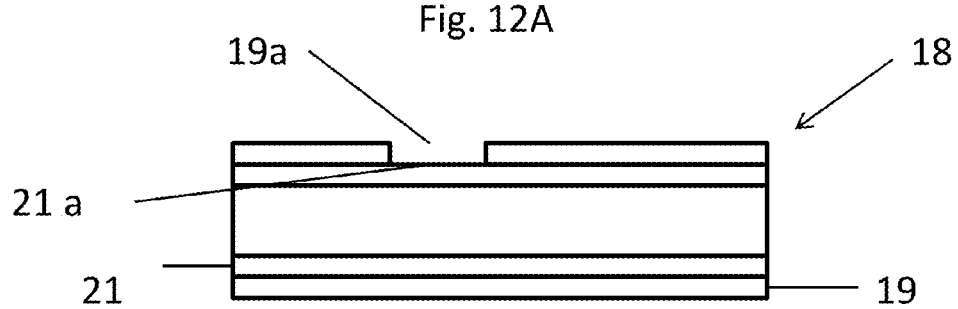
FIG. 12B is a partial schematic cross sectional view of a material strip after a laser marking process.

FIG. 2 shows a can feeding system 10 for the can tab press 12 that includes a marking system 30 such as a laser marking system. Marking system 30 may be configured to mark the material strip 18 with indicia 15 (shown in FIGS. 9 and 10). As shown in FIGS. 11A-12B, material strip 18 may include an aluminum base layer 23 that has been pre-coated with an outer coating layer 19 and an inner coating layer 21. In some embodiments, base layer 23 may be coated on both sides with inner and outer coating layers 19, 21 (as shown in FIGS. 11B and 12B). Alternatively, only one side of the base layer 23 may be coated with layers 19, 21 (as shown in FIGS. 11A and 12A). In other embodiments, one side of the base layer 23 may have at least two layers 19, 21 of coating and the other side may have only one layer 19. The coating layers 19, 21 may be made of an epoxy coil coated material as applied by Pre-Coat of St. Louis, Mich.

The marking system 30 may be configured to remove a portion of the top coating layer 19, creating a laser etched area 19a, so that an exposed area 21a of the bottom coating layer 21 is revealed, thus forming the indicia 15. In exposing bottom coating layer 21, some of the bottom coating layer 21 may also be removed. Marking system 30 removes a portion of the top coating layer 19 after the material strip 18 is dereeled from the dereeler 14 and before it enters the isolation mechanism 16 and the press 12. Dereeler 14 and isolation mechanism 16 may be provided as one machine.

Material strip 18 has a front side 18a and an opposing back side 18b connected to each other by an upper edge 18c and an opposing lower edge 18d (as described relative to its position within the marking system 30). Press 12 is configured to form a tab 13 (shown in FIGS. 9 and 10) from the material strip 18 as described above.

Drivers 11 causes the material strip 18 to uncoil. The press 12 pulls the material strip 18 on an intermittent basis, in between press-forming tabs. As shown schematically in FIG. 3, an isolation mechanism 16 may be employed to convert the discontinuous pulling motion of the material strip 18 as it enters the press 12 into continuous or semi-continuous motion as it is uncoiled from the dereeler 14 and while it passes through the marking system 30.

Figure 3:
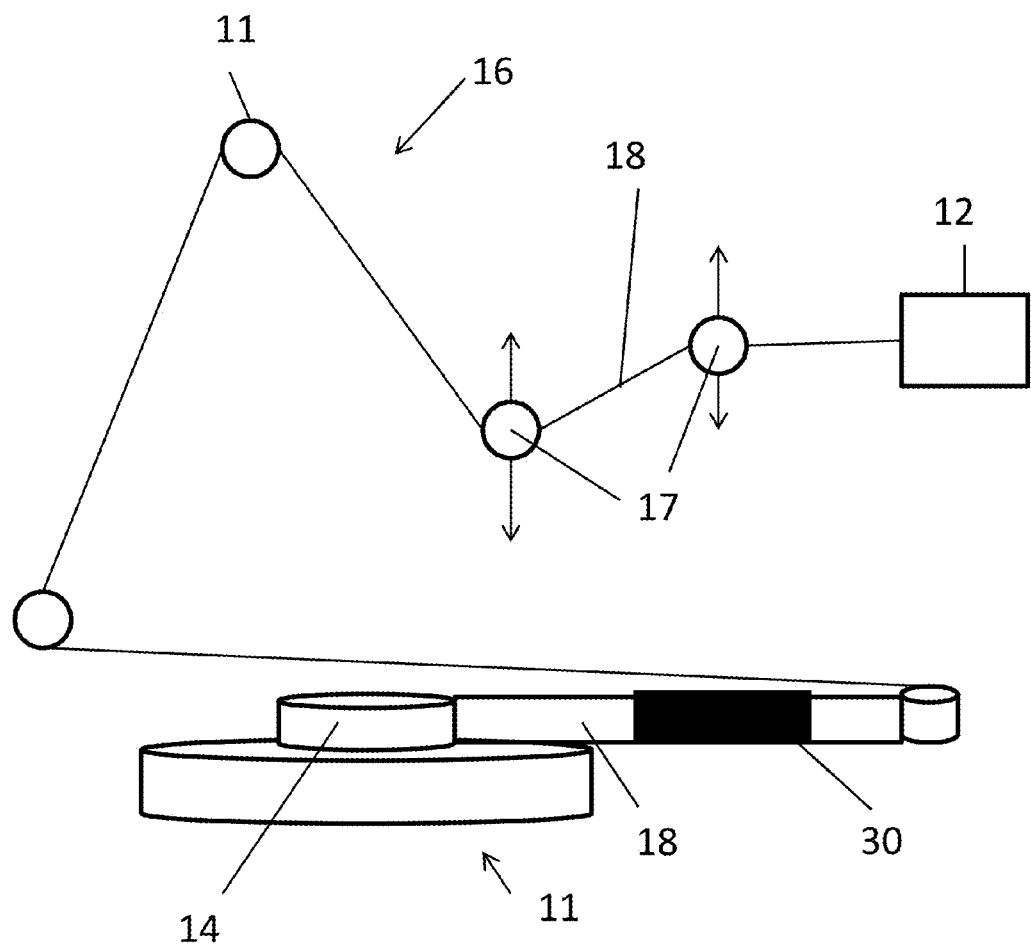
FIG. 3 is a partial schematic view of a can tab feeding system.

In one embodiment, the isolation mechanism 16 includes a take-up roller 17 or multiple take-up rollers that are configured to move relative to the dereeler 14 so as to adjustably take up slack in the material strip 18 prior to it entering the press 12. As shown in FIG. 3, take-up roller 17 may be configured to move vertically up and down, towards and away from the dereeler 14 to enable varying lengths of material strip between the dereeler 14 and the press machine. In this way, as the press 12 pulls the material strip 18, the isolation mechanism 16 reduces the slack in the material strip 18. In the exemplary embodiment shown in FIG. 3, as the press 12 stops or slows its pulling motion, the take-up roller 17 moves vertically down, towards the dereeler 14 in order to take up greater slack. As the press machine starts or increases speed, the take-up roller 17 moves vertically up, away from the dereeler to take up less slack. The movement of take-up roller 17 thus keeps the dereeler uncoiling at a constant or near constant speed. In this way, the can feeding system 10 is configured such that the marking system 30 acts on the tab material strip 18 before the isolation mechanism 16, while it is moving at a constant or near constant speed. While take-up rollers 17 are shown in this embodiment, other types of mechanisms may be employed to regulate the speed at which the material strip 18 passes through the marking system 30.

Figure 9:
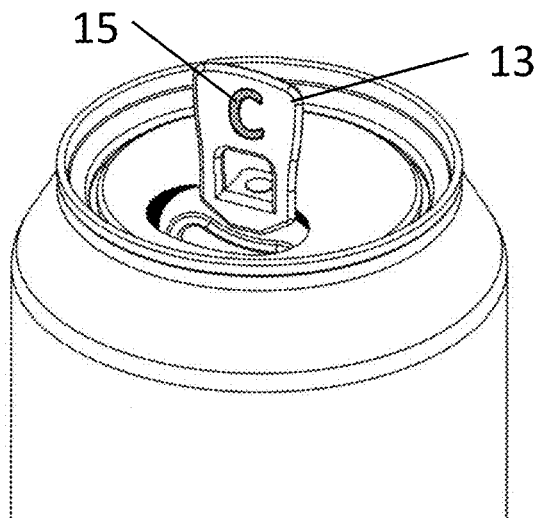
FIG. 9 is a front partial perspective view of a can with a tab that has laser etched indicia.
Figure 13:
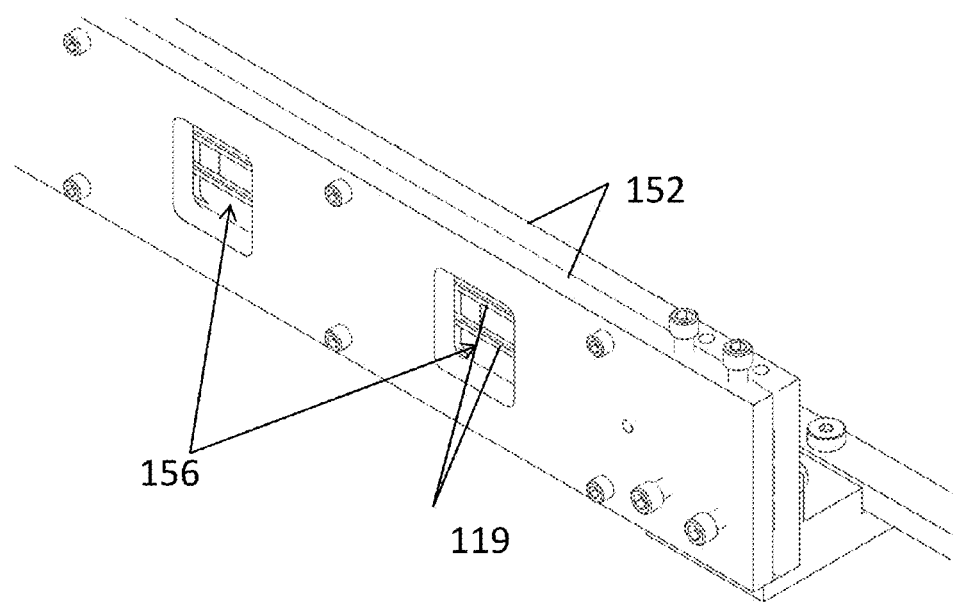
FIG. 13 is a partial perspective view of a laser marking system.
Figure 14:
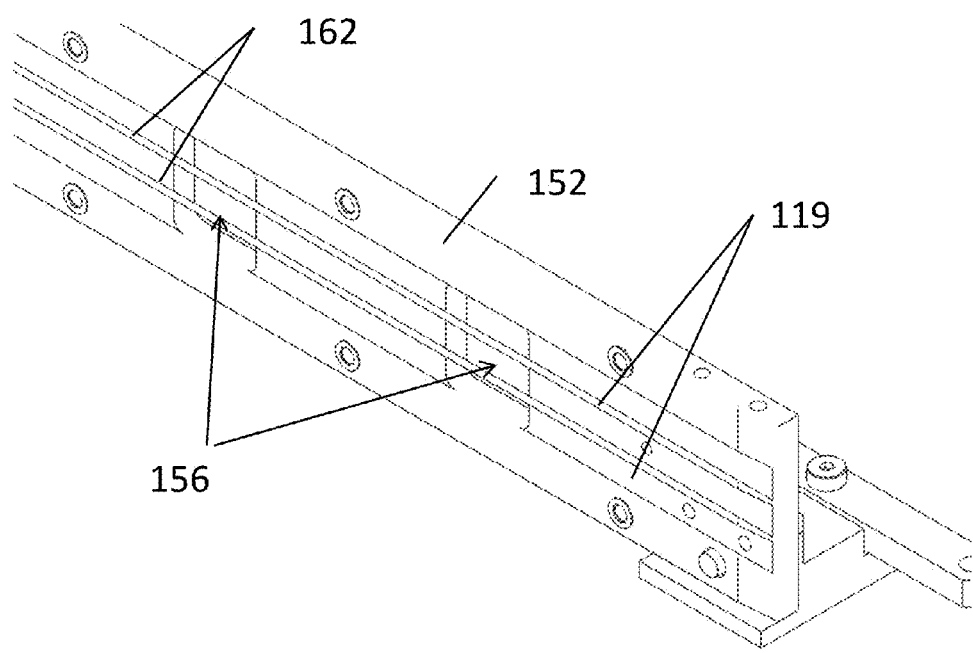
FIG. 14 is a partial perspective view of the laser marking system shown in FIG. 13, with portions cut away.
Figure 15:
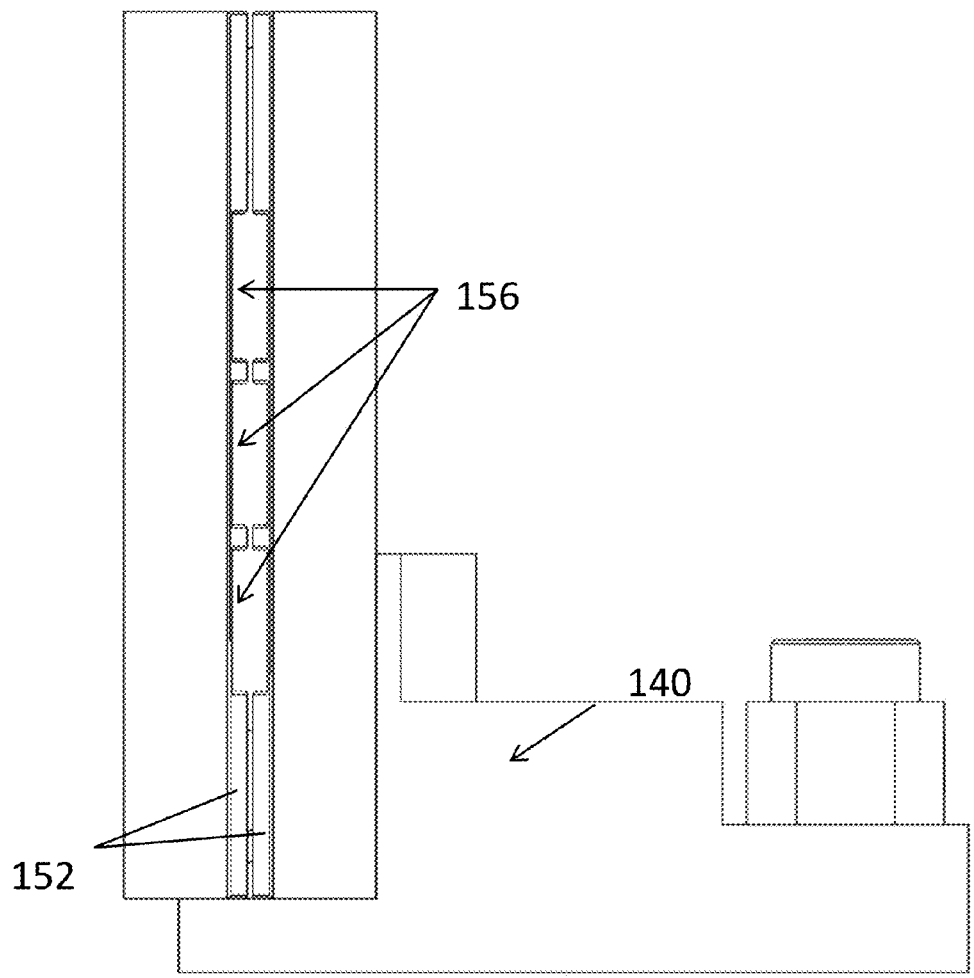
FIG. 15 is a top view of the laser marking system shown in FIGS. 13 and 14.

The marking system 30 may be, for example, a laser marking and material strip handling system or a laser marking registration system. As shown in FIGS. 9 and 10, the laser marking system is configured to mark the material strip with indicia 15, such as a logo, registration mark, design, lettering, or numbering on either the front side 18a, the back side 18b, or both sides 18a,b of the material strip. The laser marking system may include a laser subsystem 80, and a vision subsystem 90. As shown in FIGS. 5-8, the laser marking system may further include a material handling subsystem 40, which is configured to work with an air supply subsystem 70. Alternatively, as shown in FIGS. 13-15, the laser marking system may include a material handling subsystem 140.

The material handling subsystem 40 may further include a support 42 mounted on a base plate 44 that is configured to position the material strip 18 during laser marking. Support 42 is flanked by a pair of rollers 46, 48 that are also mounted on base plate 44 and work to guide the material strip 18 towards and away from the support 42. Roller 48 works in conjunction with a an encoder wheel 50 (also mounted on base plate 44) to control the motion of the material strip 18.

Figure 5:
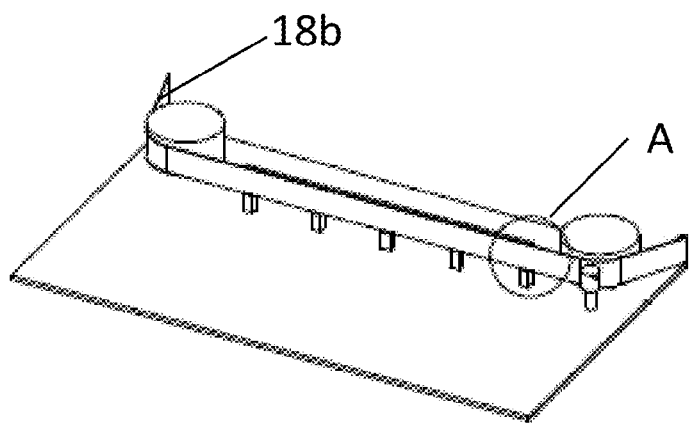
FIG. 5 is a partial perspective view of a laser marking system.
Figure 5A:
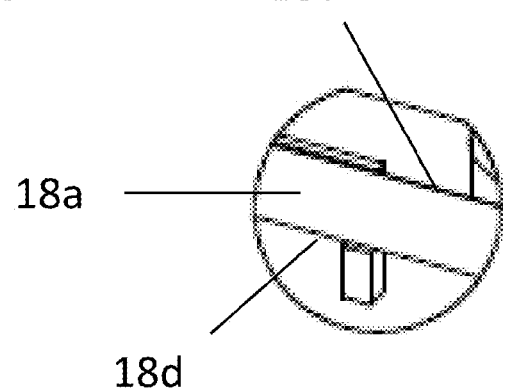
FIG. 5A is a magnified partial perspective view of section A of the laser marking system shown in FIG. 4.
Figure 6:
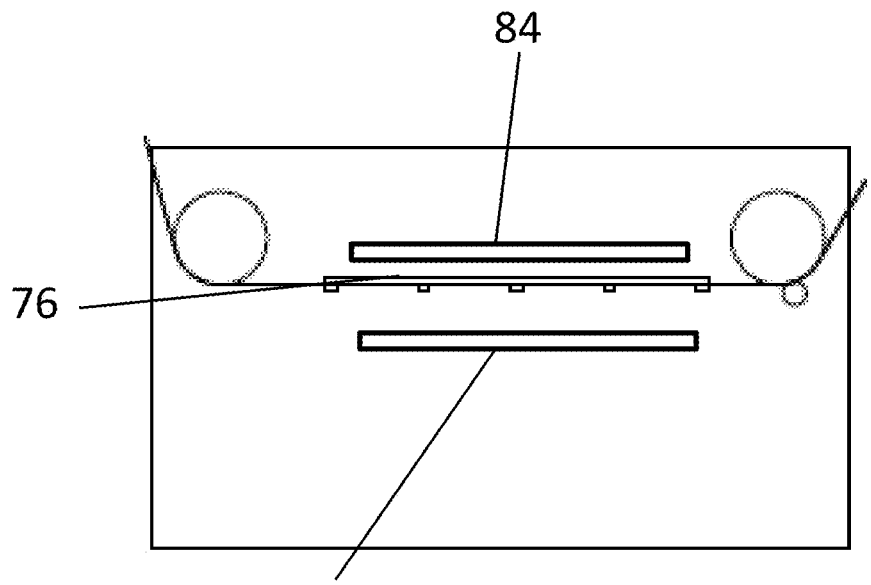
FIG. 6 is a partial top view of a laser marking system, including a material strip.
Figure 7:
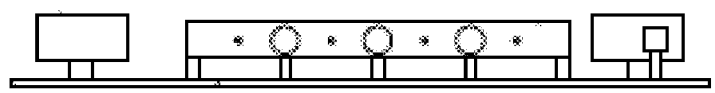
FIG. 7 is a partial front view of a laser marking system.
Figure 8:
FIG. 8 is a partial front view of a laser marking system, including a material strip.

As best shown in FIGS. 5, 5A, support 42 includes a back plate 52 that is oriented substantially parallel to the orientation of the uncoiled material strip 18 as it passes from roller 46 to roller 48. Back plate 52 has a front side 52a that is configured to be located proximate the back side 18b of the material strip and an opposing back side 52b, which is proximate a laser 84 which may be used for marking the back side 18b of the material strip (as outlined below). Back plate 52 has two sets of holes: air holes 54 and laser holes 56. Each of the sets of holes 54, 56 are formed as bores disposed between the front and back sides 52a,b of the back plate 52. Air holes 54 work in conjunction with the air supply subsystem 70 to stabilize the material strip 18 near the back plate 52. Laser holes 56 enable marking on back side 18b of the material strip 18.

Back plate 52 is connected to the base plate 44 by one or more support guides 58. Back plate 52 and support guides 58 may be formed integrally as one piece or may be formed separately. In some embodiments, each of the one or more guides 58 includes a guide plate 60 that supports the lower edge 18d of the material strip. In other embodiments, back plate 52 includes a guide roller 62 (shown in FIG. 4B) that supports the lower edge 18d of the material strip.

As the material strip 18 uncoils from the dereeler 14, encoder wheel 50 presses the material strip 18 against roller 46 to position the strip 18 before the strip can be supported by support 42. Roller 48 may be configured to position the strip 18 as it passes away from the marking system 30 and towards the isolation mechanism 16 and the press 12.

In addition to the guides 58, the material strip is held in place next to the back plate 52 using a Bernoulli grip created by the air holes 54 in conjunction with the air supply subsystem 70. A Bernoulli grip relies on the Bernoulli airflow principle by using air flow to adhere to an object without physical contact. Specifically, the air supply subsystem 70 creates a high velocity airstream that is connected to the air holes 54 using a compressor 72 and/or blower 74.

The high velocity air stream forms an area 76 of low static pressure between the back side 18b of the material strip 18 and the front side 52a of the back plate 52. The air supply subsystem 70 may be configured such that this low pressure area 76 has a pressure that is lower than atmospheric pressure. The pressure differential between the low pressure area 76 and the atmospheric pressure outside of the area 76 creates a net force on the material strip 18 in the direction towards the area 76. Positive pressure is thus maintained against the front side 52a of the back plate 52, while an air gap is maintained between the material strip 18 and the back plate 52. In this way, the marking system 30 does not require that the upper edge 18c of the material strip be constrained and the back side 18b of the material strip does not contact the front side 52a of the back plate. By minimizing contact, scratching of the outer coating layer 19 of the material strip may also be minimized.

Alternatively to the material handling subsystem 40, a material handling subsystem 140, shown in FIGS. 13-15, may be used in conjunction with the material strip 18 during the laser etching process. The material handling subsystem 140 includes two plates 152 that are parallel and on either side of the material strip 18. These plates may include laser holes 156. Each of the holes 156 are formed as apertures disposed between the front and back sides 152a,b of the plates 152. Laser holes 156 enable marking on the front and back sides 18a,b of the material strip 18. The material handling subsystem 140 relies on longitudinally extending rails 119 on the plates 152 to hold the material strip 18 in place as it passes between the front and back lasers 82, 84. Rails 119 contact the material strip 18 at areas that are not critical to the resulting tab. For example, rails 119 may contact the material strip in an area that is later scrapped during tab formation.

As the material strip 18 passes through the material handling subsystem 40, 140, the laser subsystem 80 creates indicia 15 on either or both sides 18a,b of the material strip using either front and back lasers 82, 84 or one of lasers 82, 84. Laser 82, 84 may be configured to mark the one or both of sides 18a,b of the material strip as it passes one or more of the holes 56, 156. In some embodiments, the lasers 82,84 may be CO2 lasers supplied by VideoJet. These lasers are each configured to remove a portion of the outer coating layer 19, thus exposing the area 21a of the inner coating layer 21 that forms the indicia 15. While both of the embodiments shown etch the material strip 18 while the material strip 18 is oriented vertically (i.e. with the upper edge 18c oriented up), it will be appreciated that the material strip 18 may be etched while horizontally oriented, with either side 18a,b oriented up.

Figure 16:
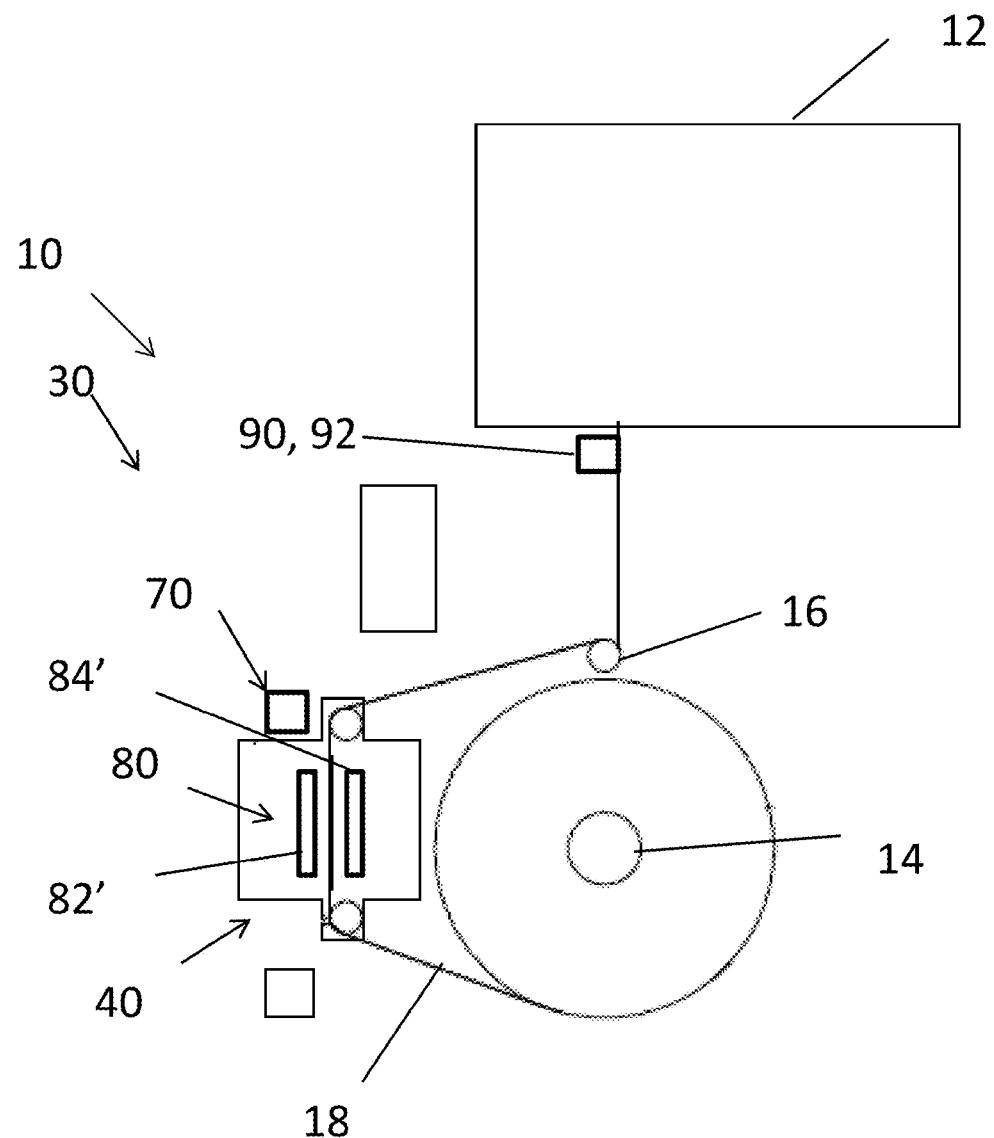
FIG. 16 is a schematic top view of a can tab feeding system, including a digital printer.

In alternative embodiments, such as that shown in FIG. 16, one or more digital printers 82', 84' may be used in place of a laser 82, 84 to create indicia on the material strip 18 before it is formed into tabs 13. In this way, rather than removing material from the material strip 18 to create the indicia 15, material such as ink is added. For example, a digital printer such as an inkjet printer or a laser toner printer may deposit ink on one or both sides 18a,b the base layer 23 of a material strip 18. In this example, the material strip 18 may not have coating layers 19, 21 or may only have one coating layer 19. The ink may be deposited in such a way as to provide a negative image. In other words, an area on the tab around indicia 15 may be printed such that the indicia appears as the color of the base layer 23 of the material strip 18. At least a portion of the tab 13 around the indicia is colored with ink. Alternatively, the indicia 15 itself may be printed and the area around the indicia 15 may be the color of the base layer 23 of the material strip 18.

The vision subsystem 90 may be located proximate to the press 12. The vision subsystem 90 includes a sensor 92. Sensor 90 may be a digital camera. The sensor 90 senses the locations of the indicia 15 in the material strip 18 relative to the press 12. The actual locations of the indicia may be compared to a predetermined or desired location of the indicia 15 in order to confirm the accuracy of their positions. If the actual locations are different from the predetermined locations, the vision subsystem 90 may send a signal to the marking system 30 to slow down or speed up the marking process. In this way, the feedback provided by the sensor 90 is used to compensate for image drift.

The present invention is not limited to a particular type of laser. Preferably, the laser system is capable of marking a tab strip having a two, three, or four tab configuration at modern commercial speeds, such as approximately 650 strokes per minute, or at least 480 strokes per minute. 650 strokes per minute equates to approximately 93 milliseconds available to create indicia. The time required to create a given indicia is dependent on the complexity and size of the indicia.

The forgoing descriptions are not intended to be limiting in terms of machinery employed in the tab feeding process. Specifically, it will be appreciated that several types of machines and apparatuses may be used to convey material for forming tabs into a tab forming machine. Additionally, different types of tab forming machines may be employed, such as a tab forming machine that integrally marks and forms tabs. The material used to form the tabs may also vary. For example other types of metal may be used as a base layer and other types of coating may also be used. Further, the present invention is not limited to solving each problem described in the Background section. For example, the inventors intend to claim a system that does not address the challenge of scratching the coated material.

What is claimed:

1. A laser marking system located in a material feeding system for a tab forming press, the laser marking system comprising:

an isolation mechanism located in a path of a tab material strip between a tab material dereeler and the tab forming press, the isolation mechanism converting discontinuous motion of the tab material strip proximate the tab forming press into continuous motion of the tab material strip at the dereeler; and a laser system suitable for marking the tab material strip, the laser marking system being located between the dereeler and the isolation mechanism such that the laser system acts on the tab material strip while it is moving at a relatively constant speed.

2. A laser marking and material strip handling system located in a feeding system for a tab forming press, the laser marking and material strip handling system comprising:

a laser system suitable for marking a tab material strip;

a plate oriented parallel to an orientation of the tab material strip, the plate being spaced apart from the tab strip material and including at least one hole configured to enable air flow therethrough, whereby the air flow is configured to provide a supporting layer of air on one side of the tab stock which in combination with atmospheric air on the opposite side creates a non-contacting guide for the tab material strip near the laser marking system.

3. The system of claim 2, further comprising a guide for supporting a lower edge of the material strip.

4. The system of claim 3, wherein the guide is a roller.

5. The system of claim 3, wherein the guide is a plate.

6. The system of claim 2, wherein the material strip is unconstrained from above the material strip.

7. The system of claim 2, further comprising an gas supply system for providing gas to the at least one hole.

8. A laser marking registration system comprising:
   a laser system suitable for marking a tab material strip with indicia and with a registration mark; and
   a vision subsystem located proximate to a press for sensing the location of the registration mark, whereby the sensed location of the registration mark can be compared with a predetermined, desired location of the registration mark for confirming accuracy of the press tooling relative to the indicia and providing feedback to the laser marking system to compensate for image drift.

9. The system of claim 8, wherein the laser marking system is proximate to a tab material coil dereeler.

10. The system of claim 8, wherein the indicia includes at least one of a logo, design, lettering, or numbering.

11. The system of claim 8, further including the press.

12. The system of claim 11, wherein the press is a tab press.

13. The system of claim 12, wherein the press is a conversion press.

14. A laser marking and material strip handling system located in a feeding system for a tab forming press, the laser marking and material strip handling system comprising:
   a laser system suitable for marking a tab material strip; and
   a pair of plates, at least one of the plates including at least one longitudinally extending rail configured hold the material strip, and at least one of the plates including at least one opening configured to provide access for the laser system to mark the material strip as it passes through the pair of plates.

15. The laser marking and material strip handling system of claim 14, wherein both plates each have at least one longitudinally extending rail configured hold material strip.

16. The laser marking and material system of claim 14, wherein both plates each have at least one opening configured to provide access for the laser system to mark the material strip as it passes through the pair of plates.

17. A marking system located in a material feeding system for a tab forming press, the marking system comprising:
   an isolation mechanism located in a path of a tab material strip between a tab material dereeler and the tab forming press, the isolation mechanism converting discontinuous motion of the tab material strip proximate the tab forming press into continuous motion of the tab material strip at the dereeler; and
   a digital printing system suitable for marking the tab material strip, the digital printing system being located between the dereeler and the isolation mechanism such that the digital printing system acts on the tab material strip while it is moving at a relatively constant speed.

18. The marking system of claim 17 wherein the digital printing system includes a laser toner printer.

19. The marking system of claim 17 wherein the digital printing system includes an inkjet printer.

20. The marking system of claim 17 wherein the digital printing system is configured to print an indicia as a negative image.

* * * * *